(12) United States Patent
Miyashita

(10) Patent No.: US 7,703,969 B2
(45) Date of Patent: Apr. 27, 2010

(54) BACKLIGHT UNIT HAVING MULTILAYER LIGHT DEFLECTING FILM

(75) Inventor: Junji Miyashita, Fujiyoshida (JP)

(73) Assignees: Citizen Electronics Co., Ltd., Fujiyoshida-shi, Yamanashi-ken (JP); Hitachi Chemical Company, Ltd., Tokyo (JP)

( * ) Notice: Subject to any disclaimer, the term of this patent is extended or adjusted under 35 U.S.C. 154(b) by 61 days.

(21) Appl. No.: 11/450,085

(22) Filed: Jun. 9, 2006

(65) Prior Publication Data

US 2007/0002587 A1    Jan. 4, 2007

(30) Foreign Application Priority Data

Jun. 10, 2005    (JP) ............... 2005-171699

(51) Int. Cl.
*F21V 7/22*    (2006.01)
*F21V 11/02*    (2006.01)

(52) U.S. Cl. ............. 362/607; 362/617; 362/618; 362/290; 362/342; 349/66

(58) Field of Classification Search .......... 362/607, 362/617, 618, 619, 627, 290, 342; 349/66
See application file for complete search history.

(56) References Cited

U.S. PATENT DOCUMENTS

| | | | | |
|---|---|---|---|---|
| 693,088 A * | 2/1902 | Wadsworth | ............. | 359/613 |
| 942,589 A * | 12/1909 | Salsbury | ............. | 362/290 |
| 3,653,138 A * | 4/1972 | Cooper | ............. | 349/66 |
| 4,384,764 A * | 5/1983 | Tischer et al. | ............. | 349/66 |
| 5,157,526 A * | 10/1992 | Kondo et al. | ............. | 349/63 |
| 5,254,388 A * | 10/1993 | Melby et al. | ............. | 428/120 |
| 5,600,456 A * | 2/1997 | Maruyama et al. | ............. | 349/66 |
| 6,210,644 B1 * | 4/2001 | Trokhan et al. | ............. | 362/290 |
| 6,527,410 B2 * | 3/2003 | Yamaguchi | ............. | 362/243 |
| 6,609,807 B2 * | 8/2003 | Torihara et al. | ............. | 362/613 |
| 7,242,446 B2 * | 7/2007 | Usami | ............. | 349/66 |
| 2003/0184691 A1 | 10/2003 | Miyashita | | |
| 2006/0268571 A1 * | 11/2006 | Harada et al. | ............. | 362/618 |
| 2007/0121325 A1 * | 5/2007 | Barber | ............. | 362/290 |

FOREIGN PATENT DOCUMENTS

JP    2002-42529 A2    2/2002

* cited by examiner

*Primary Examiner*—Ismael Negron
(74) *Attorney, Agent, or Firm*—Brinks Hofer Gilson & Lione

(57) ABSTRACT

A backlight unit includes a light guide plate having opposite side surfaces and a peripheral edge surface. A part of the peripheral edge surface is a light entrance surface, and one of the opposite side surfaces is a light exit surface. A light source is disposed adjacent to the light entrance surface of the light guide plate. A light deflecting film is disposed adjacent and parallel to the light exit surface of the light guide plate. The light deflecting film has a multilayer construction wherein light reflecting layers and light transmitting layers are stacked one by one alternately. The light reflecting and transmitting layers are tilted at a predetermined angle to the light exit surface.

10 Claims, 5 Drawing Sheets

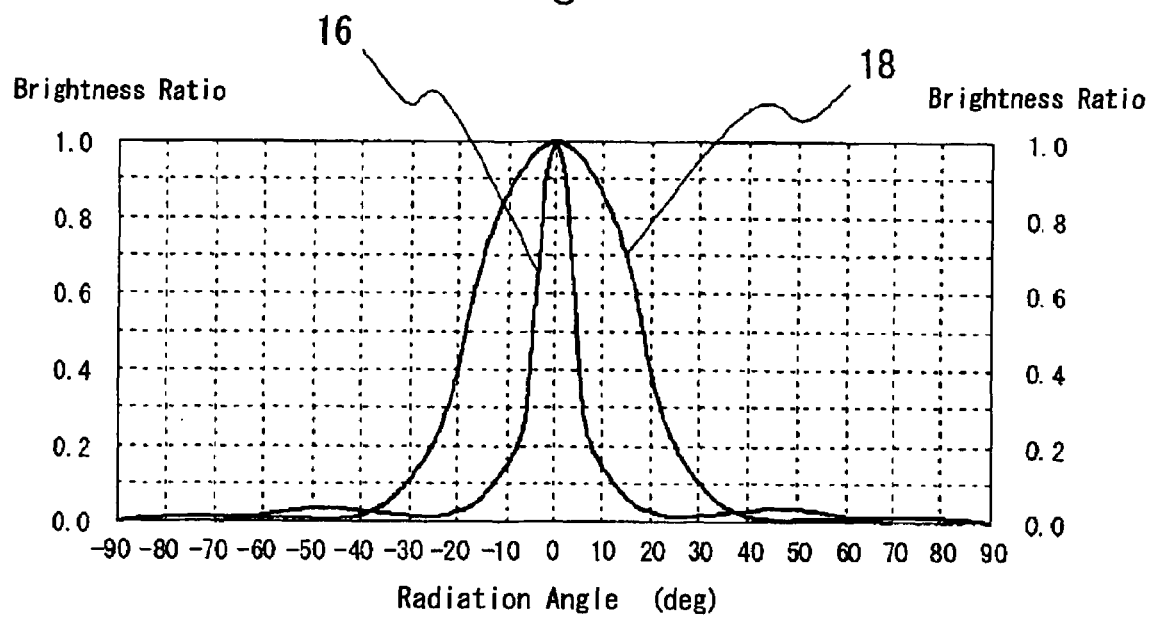

BACKLIGHT UNIT HAVING MULTILAYER LIGHT DEFLECTING FILM

This application claims priority under 35 U.S.C. §119 to Japanese Patent Application No. 2005-171699 filed Jun. 10, 2005, the entire content of which is hereby incorporated by reference.

FIELD OF THE INVENTION

The present invention relates to backlight units for use in display devices such as liquid crystal display devices. More particularly, the present invention relates to a backlight unit that illuminates a small-sized liquid crystal display device mounted in portable devices such as cellular phones and personal digital assistants.

DESCRIPTION OF THE BACKGROUND ART

Recently, display devices using liquid crystal cells have been mounted in a variety of electronic devices, e.g. timepieces, telephones, and personal computers. Of such electronic devices, timepieces, cellular phones, etc. may be used at night or in darkness. Therefore, many of these electronic devices are equipped with a backlight unit for illuminating the liquid crystal cell. Backlight units used for this purpose can be divided into an aligned-light type in which a liquid crystal display panel and a light source are disposed to face each other across a light-diffusing plate, and an edge-light type in which a liquid crystal display panel and a light guide plate are disposed facing each other, and a light source is disposed adjacent to the light guide plate outside the peripheral edge thereof so that light from the light source enters the light guide plate through the peripheral edge surface thereof (for example, see Japanese Patent Application Publication No. 2002-42529).

The edge-light type backlight unit is more advantageous than the aligned-light type backlight unit in that it is possible to achieve a low profile and to minimize the influence of heat generated from the light source on the liquid crystal display panel.

FIGS. 5(a), 5(b) and 6 show a conventional edge-light type backlight unit. FIG. 5(a) is a plan view, and FIG. 5(b) is a sectional view taken along the line 5b-5b in FIG. 5(a). FIG. 6 is a schematic view showing the optical path of light emitted from a light source of the backlight unit.

As shown in the figures, the backlight unit has in a housing 1 a rectangular light guide plate 2 formed from a transparent plastic member, and four light-emitting diodes (hereinafter abbreviated as "LEDs") 3 are provided as a light source adjacent to a peripheral edge surface 2a of the light guide plate 2 that serves as a light entrance surface. Light emitted from the LEDs 3 enters the light guide plate 2 through the peripheral edge surface 2a thereof and travels in the light guide plate 2 while undergoing total reflection therein. The bottom surface 2b of the light guide plate 2 is configured to have a multiplicity of prisms as shown in the figures so that, while the light entered into the light guide plate is undergoing total reflection between the top surface 2c and the bottom surface 2b of the light guide plate 2 during traveling, the incident angle of the light impinging on the top surface 2c, which is a light exit surface, gradually decreases, and the light eventually exits to the outside through the light exit surface. A part of the light emitted from the LEDs 3 exits to the outside through the bottom surface 2b of the light guide plate 2. The light, however, is reflected by a reflecting sheet 4, e.g. a silver- or white-color sheet, back to the light guide plate 2. The light exiting to the outside through the top surface 2c of the light guide plate 2 is directed toward a liquid crystal display panel (not shown) by a prism sheet 5.

It is of course desirable that the backlight unit has a capability to illuminate the back surface of a liquid crystal display panel with high intensity.

Further, for a liquid crystal display panel of, for example, a cellular phone, it is also desirable that the backlight unit illuminates the liquid crystal display panel so that the liquid crystal display panel has high brightness in particular when it is squarely seen from the front thereof.

SUMMARY OF THE INVENTION

According to the present invention, there is provided an edge-light type backlight unit. The backlight unit comprises a light guide plate having opposite side surfaces and a peripheral edge surface. A part of the peripheral edge surface is a light entrance surface, and one of the opposite side surfaces is a light exit surface. A light source is disposed adjacent to the light entrance surface of the light guide plate. A light deflecting film is disposed adjacent and parallel to the light exit surface of the light guide plate. The light deflecting film has a multilayer structure wherein light reflecting layers and light transmitting layers are stacked one by one alternately. The reflecting layers and said transmitting layers are tilted at a predetermined angle relative to the light exit surface.

Preferably, the stacking direction of the reflecting layers and the transmitting layers in the light deflecting film is coincident with a light traveling direction in which light from the light source enters the light guide plate through the light entrance surface.

More specifically, the reflecting layers and the transmitting layers extend perpendicular to said light traveling direction and said predetermined angle is less than 90 degrees and faces in said light traveling direction.

Preferably, the tilt angle of the reflecting and transmitting layers is in a range of 60-80 degrees. More preferably, the tilt angle is a range of 65-75 degrees.

Preferably, an overall size in the stacking direction of the reflecting layer and the transmitting layer adjacent each other is less than or equal to 0.2 mm, and the size in the stacking direction of said reflecting layer is less than or equal to 1 micron.

Preferably, the size of the light deflecting film in a direction normal to the light exit surface is less than or equal to 0.3 mm.

In the backlight unit according to the present invention, a light deflecting film arranged as stated above is disposed adjacent and parallel to the light exit surface of the light guide plate to make the directivity of light exiting the light exit surface higher, thereby making it possible to increase the brightness of the light exit surface.

The above and other objects, features and advantages of the present invention will become more apparent from the following description of the preferred embodiments thereof, taken in conjunction with the accompanying drawings.

BRIEF DESCRIPTION OF THE DRAWINGS

FIG. 4 is a graph showing directivities of a light exiting the backlight unit toward a liquid crystal display panel in the embodiment of the present invention.

DETAILED DESCRIPTION OF THE PREFERRED EMBODIMENTS

Figure 1A:
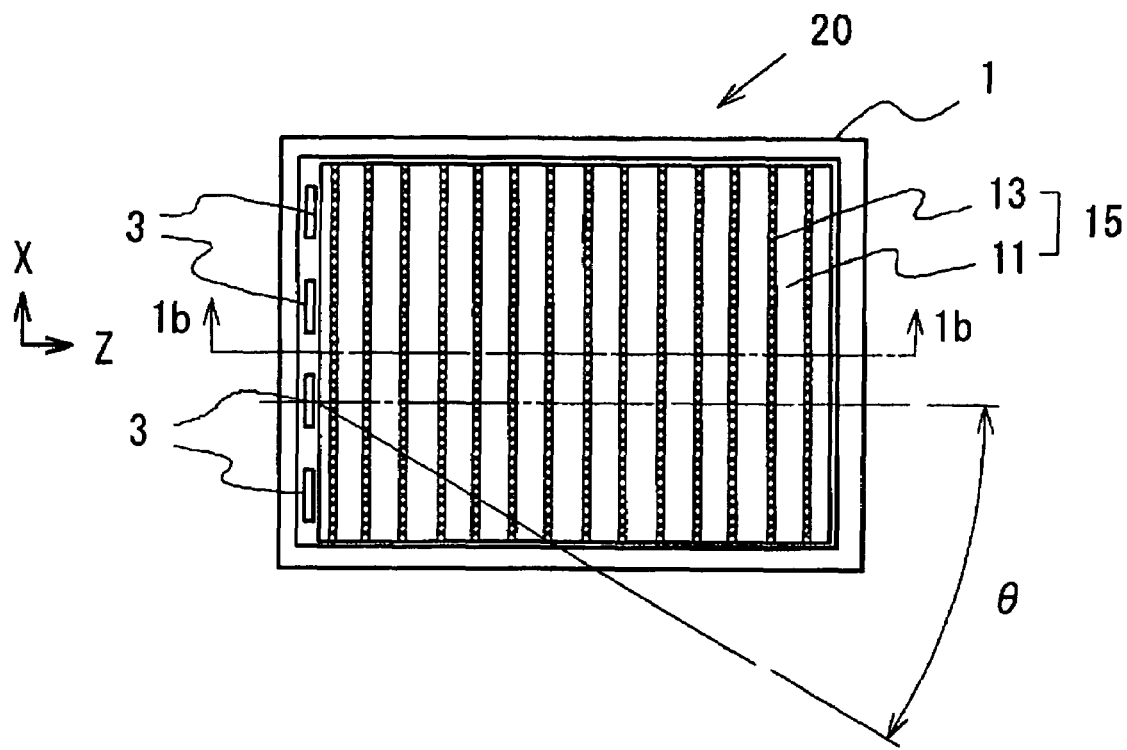
FIG. 1(a) is a plan view of a backlight unit according to an embodiment of the present invention.
Figure 1B:
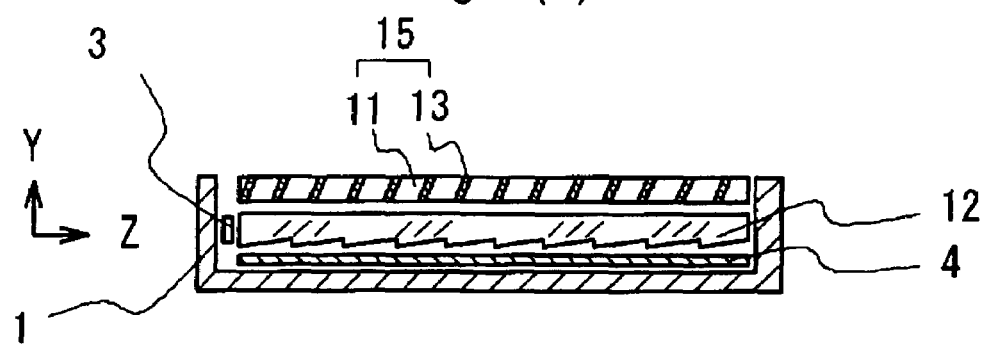
FIG. 1(b) is a sectional view taken along the line 1b-1b in FIG. 1(a).
Figure 2:
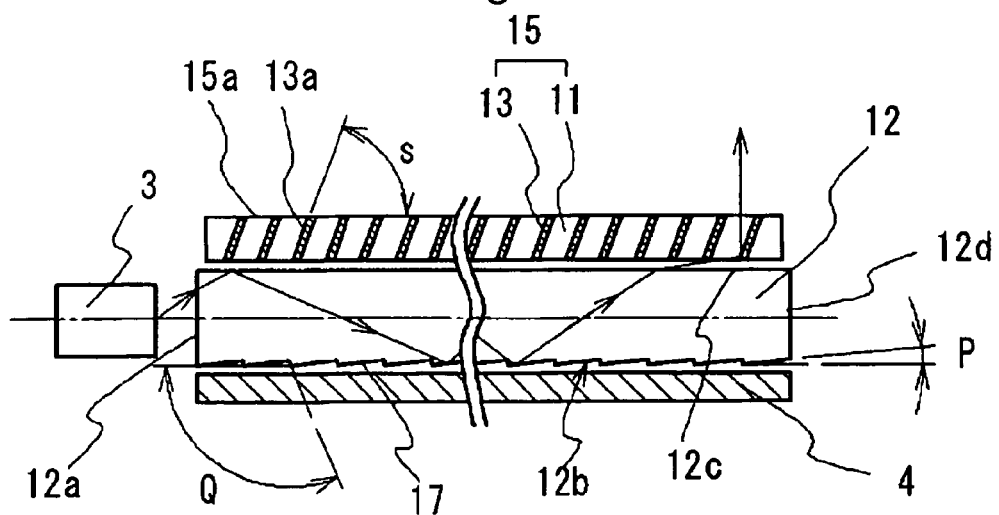
FIG. 2 is a schematic view showing the optical path of light emitted from a light source in the embodiment of the present invention.

An embodiment of the backlight unit according to the present invention will be described below in detail with reference to FIGS. 1(a) to 4.

As shown in the figures, a backlight unit 20 according to this embodiment has in a housing 1 a substantially rectangular light guide plate 12 made of a transparent member. A plurality of (i.e., four in this embodiment) light-emitting diodes (hereinafter referred to as "LEDs") 3 are provided as a light source adjacent to a peripheral edge surface 12a of the light guide plate 12 that serves as a light entrance surface. Light emitted from the LEDs 3 enters the light guide plate 12 through the peripheral edge surface 12a thereof and travels in the light guide plate 12 while repeating total reflection therein.

The bottom surface 12b of the light guide plate 12 is configured to have a multiplicity of prisms 17 arranged parallel and adjacent to each other. The prisms 17 extend perpendicularly to the direction of emission of the light from the LEDs 3 toward the light guide plate 12. As the light advances through the light guide plate 12 while repeating the total reflection between the top surface 12c and the bottom surface 12b of the light guide plate 12, the incident angle of the light impinging on the top surface 12c, which is a light exit surface, is gradually decreased by the prisms 17, thereby allowing the light to exit to the outside through the top surface 12c. A reflecting sheet 4, e.g. a silver-color sheet, is disposed adjacent to the bottom surface 12b of the light guide plate 12. The reflecting sheet 4 reflects light leaking out from the light guide plate 12 back to the light guide plate 12. A light deflecting film 15 is disposed adjacent and parallel to the top surface or light exit surface 12c of the light guide plate 12. Light exiting the light guide plate 12 through the light exit surface 12c passes through the light deflecting film 15 to illuminate the back of a liquid crystal display panel (not shown), as will be described later.

Each of the prisms 17 of the light guide plate 12 has one prism slant surface facing toward the LEDs 3 and having a first tilt angle P and the other prism slant surface having a second tilt angle Q. The first tilt angles P of the respective prisms 17 are set so as to increase as the distances from the LEDs 3 to the respective prisms increase. The configuration of the prisms may vary according to the size of the backlight unit. The first tilt angle P preferably set in the range of from 0.5 to 50 degrees. The pitch thereof is preferably 0.05 to 0.3 mm.

Figure 3:
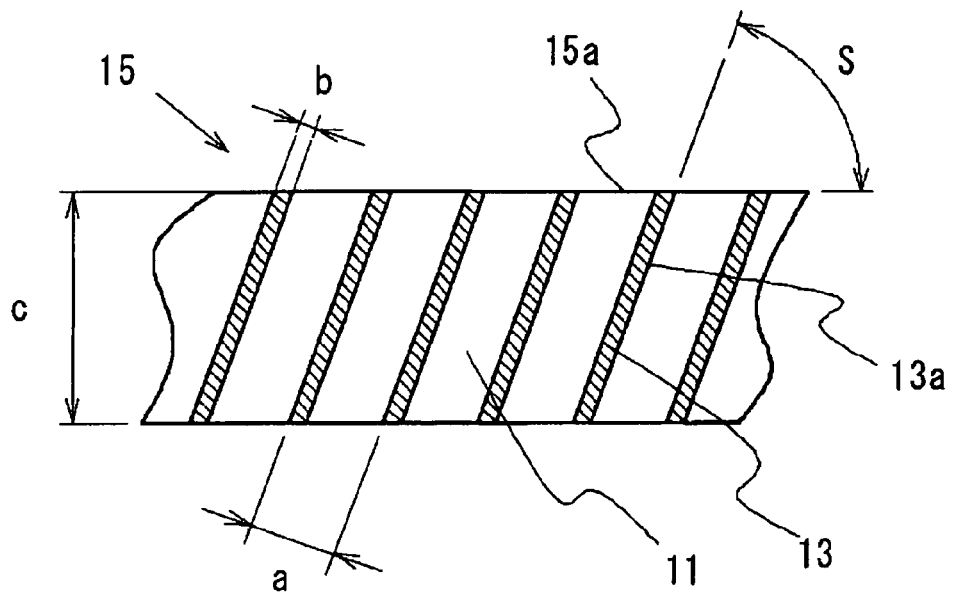
FIG. 3 is a fragmentary enlarged sectional view of a light deflecting film in the embodiment of the present invention.
Figure 5A:
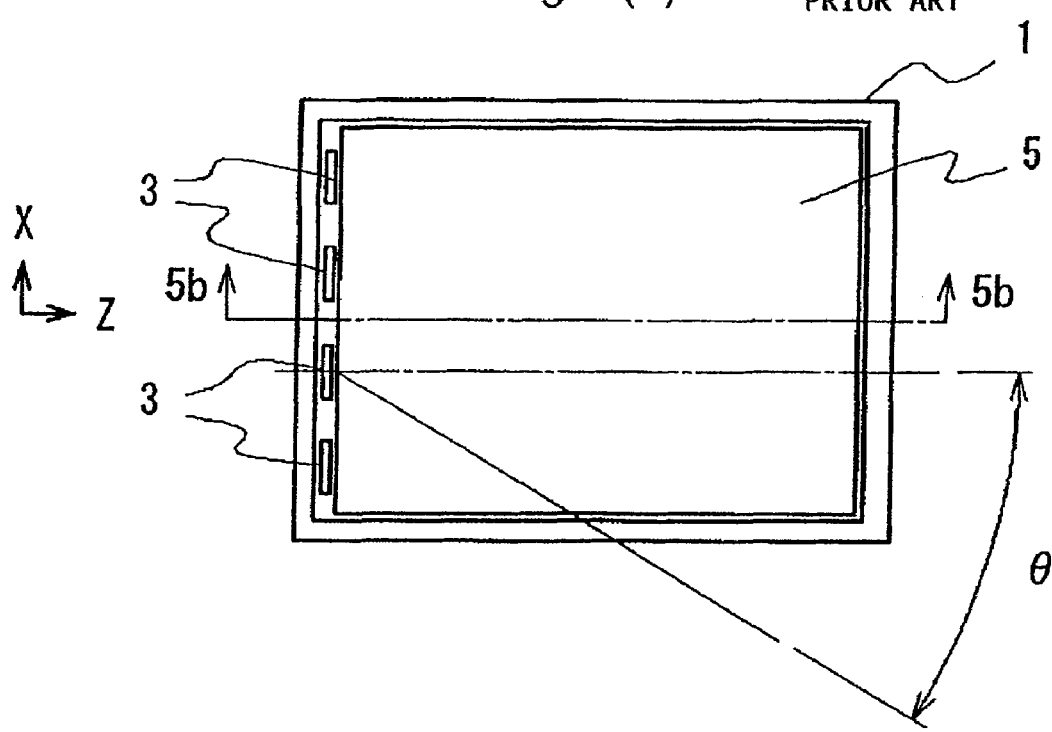
FIG. 5(a) is a plan view of a conventional backlight unit.
Figure 5B:
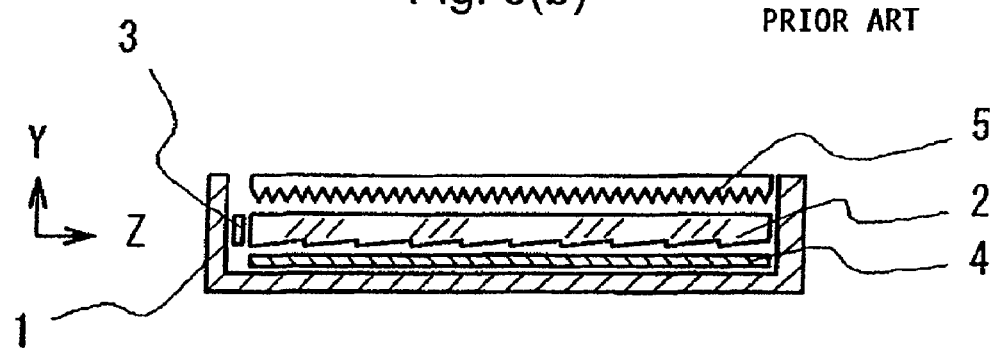
FIG. 5(b) is a sectional view taken along the line 5b-5b in FIG. 5(a).
Figure 6:
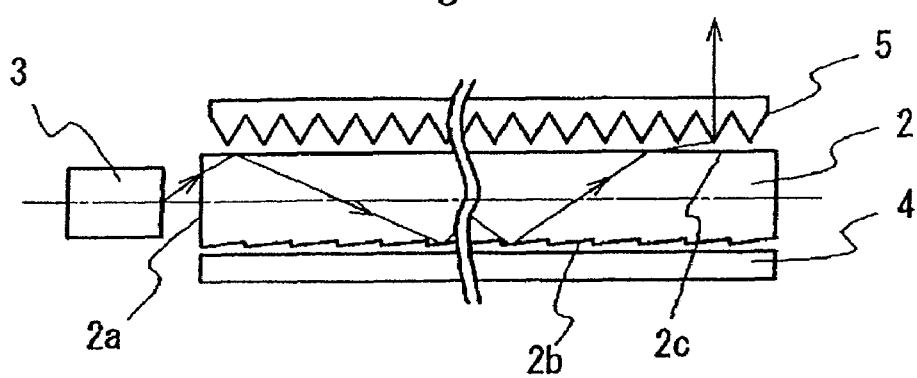
FIG. 6 is a schematic view showing the optical path of light emitted from a light source in the conventional backlight unit.

The light deflecting film 15 is a film-shaped member formed by alternately stacking a light reflecting layer 13 and a light transmitting layer 11. The stacking direction of the light reflecting layer 13 and the light transmitting layer 11 is substantially coincident with the light traveling direction from the light entrance surface 12a of the light guide plate 12 to a peripheral edge surface 12d opposite to the light entrance surface 12a. As shown in FIG. 3, the stack plane 13a of the reflecting layer 13 is at a predetermined tilt angle S to a plane 15a of the light deflecting film 15. The value of the tilt angle S is preferably less or equal to 80 degrees. In this embodiment, the tilt angle S is 65 degrees. The light reflecting layers 13 and the light transmitting layers 11 are alternately stacked at a constant pitch a. The value of the pitch a (i.e. the overall thickness of the light reflecting and light transmitting layers 13 and 11 positioned adjacent to each other in the stacking direction) is preferably less or equal to 0.2 mm. In this embodiment, the overall thickness a is set to 0.1 mm.

The reflecting layer 13 may be made of any material having high light reflectivity, e.g., a metal film of silver, aluminum, etc., or a dielectric multilayer film. In this embodiment, a metal film of silver is used as the reflecting layer 13. The thickness b of the reflecting layer 13 is preferably less or equal to 1 μm. In this embodiment, the thickness b is set to 0.7 μm. The light transmitting layer 11 may be made of any transparent material, e.g., a transparent glass material, a transparent resin such as an acrylic resin, or a polycarbonate resin. In this embodiment, an acrylic resin is used. The thickness c of the light deflecting film 15 is preferably less or equal to 0.3 mm. In this embodiment, the thickness c is set to 0.2 mm.

The light deflecting film 15 is produced, for example, as follows. Onto one side of a planar film of a transparent acrylic resin having a thickness of 0.1 mm, silver is evaporated to a thickness of 0.7 μm to form a reflecting layer. Such planar films having respective reflecting layers formed thereon are laminated on one another to form a laminate having a predetermined thickness. The laminate is sliced in a direction at an angle of 25 degrees to the normal to the laminated planar film, thereby forming a light deflecting film 15. In this case, the angle between the reflecting layer 13 and the plane of the light deflecting film 15 is 65 degrees. The thickness of the light deflecting film 15 is, as stated above, preferably 0.2 mm in this embodiment.

Thus, in the backlight unit 20 of this embodiment, light exiting the light guide plate 12 enters the light deflecting film 15, in which the light is reflected by the reflecting layer 13. As illustrated in the figures, the surface 13a of the reflecting layer 13 that reflects the light entering the light deflecting film 15 is oriented upward (i.e. toward the liquid crystal display panel, which is not shown) so that the light reflecting layer 13 deflects the light upward. Consequently, the light exiting through the light deflecting film 15 has increased directivity in the direction of the normal to the light exit surface of the backlight unit 20 (i.e. in the direction from the light exit surface toward the liquid crystal display panel).

Figure 7:
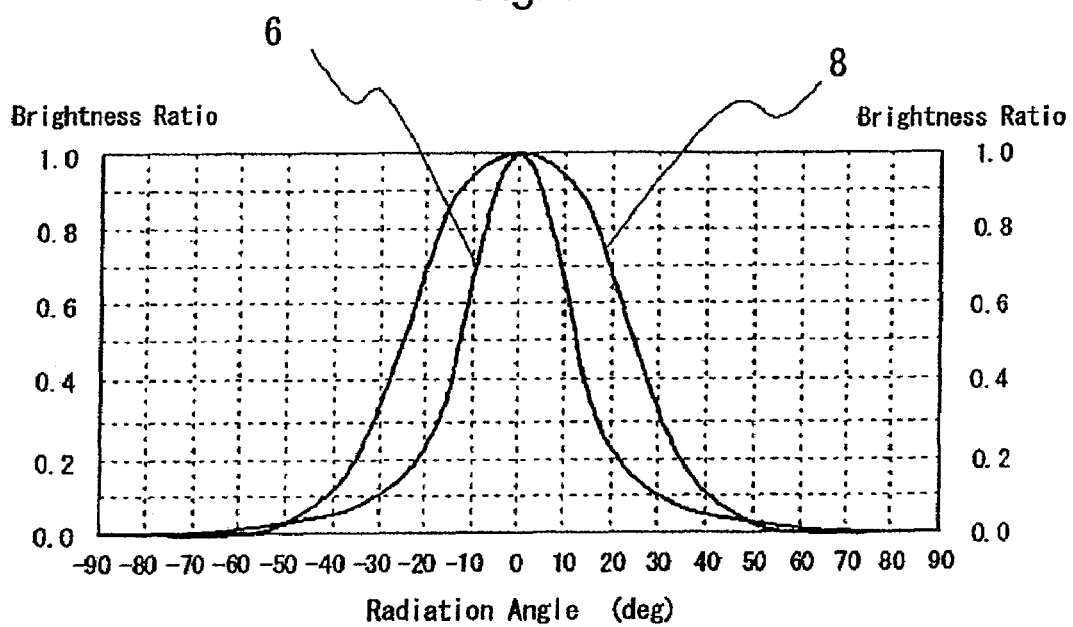
FIG. 7 is a graph showing directivities of a light exiting the backlight unit toward a liquid crystal display panel in the conventional backlight unit.

FIG. 4 shows the directivity of light exiting the backlight unit in this embodiment. A curve 16 shows the directivity in a plane defined by axes Z and Y in Figs. 1a and 1b wherein the axis Z is in parallel to the direction in which the light from the light source enters the light guide plate through the light entrance surface and the axis Y is perpendicular to the light exit surface or the top surface 12c of the light guide plate. A curve 18 shows the directiveity in a plane defined by axes X and Y wherein the axis X is normal to the axes Y and Z. The abscissa axis represents the radiation angle of the exiting light relative to the normal to the light exit surface of the backlight unit. The ordinate axis represents the brightness ratio at the light exit surface (12c) of the backlight unit. FIG. 7 shows the directivity of light exiting the conventional backlight unit stated above. It will be understood by comparison to the directivities of the conventional backlight unit shown in FIG. 7 that the light exiting the backlight unit in this embodiment has increased directivities both in the ZY plane and in the XY plane. Consequently, it is possible to increase the brightness of the light exiting the backlight unit in a direction normal to the exit surface of the backlight unit toward the liquid crystal display panel.

It should be noted that the present invention is not necessarily limited to the foregoing embodiments but can be modified in a variety of ways without departing from the gist of the present invention.

For example, although the foregoing embodiment uses a plurality of LEDs as a light source, it should be noted that a single LED may be used as a light source. In such a case also, the same advantageous effect as the above can be obtained. Further, the backlight unit according to the present invention is widely applicable to various illuminating devices, display devices, etc., including liquid crystal display devices.

The invention claimed is:

1. A backlight unit comprising:
a light guide plate comprising opposite side surfaces and a peripheral edge surface, wherein a part of the peripheral edge surface is a light entrance surface, and one of the opposite side surfaces is a light exit surface;
a light source disposed adjacent to the light entrance surface of the light guide plate for emitting light toward the light entrance surface; and
a light deflecting film disposed adjacent and parallel to the light exit surface of the light guide plate and having a first surface opposite to the light exit surface of the light guide plate and a second surface opposite the first surface, the light deflecting film having a multilayer structure wherein light reflecting layers and light transmitting layers are layered one by one alternately in the light deflecting film in a direction substantially coincident with a light traveling direction as viewed in a plan view, in which light from the light source enters the light guide plate through the light entrance surface and travels through the light guide plate, the reflecting layers and the transmitting layers extending perpendicular to the light traveling direction as viewed in the plan view, and being tilted forward in the light traveling direction so that the reflecting layers and the transmitting layers each have a first edge contacting the first surface of the light deflecting film and a second edge contacting the second surface of the light deflecting film and positioned ahead relative to the first edge in the light traveling direction and each make an angle of less than 90 degrees relative to the first and second surfaces, the reflecting layers and the transmitting layers being configured so that light that exits the light exit surface of the light guide plate impinges on the first surface of the light deflecting film and exits the second surface of the light deflecting film with an increased directivity of the light in a direction normal to the second surface, the light reflecting layers being made of metal film having high light reflectivity.

2. A backlight unit according to claim 1, wherein the metal film is made of a metal selected from a group consisting of silver and aluminum.

3. A backlight unit according to claim 2, wherein the transmitting layer is made of a material selected from a group consisting of a transparent glass material and a transparent resin.

4. A backlight unit according to claim 3, wherein the transmitting layer is made of the transparent resin and the transparent resin is made of a resin selected from a group consisting of an acrylic resin and a polycarbonate resin.

5. A backlight unit according to claim 1, wherein the predetermined angle is in the range of 60-80 degrees.

6. A backlight unit according to claim 5, wherein the predetermined angle is in the range of 65-75 degrees.

7. A backlight unit according to claim 5, wherein a combined thickness of the reflecting layer and the transmitting layer adjacent each other is less than or equal to 0.2 mm, and a thickness of the reflecting layer is less than or equal to 1 micron.

8. A backlight unit according to claim 7, wherein A backlight unit according to claim 1, wherein the combined thickness of the reflecting layer and the transmitting layer adjacent each other is about 0.1 mm, and the thickness of the reflecting layer is about 0.7 micron.

9. A backlight unit according to claim 7, wherein a thickness of the light deflecting film is less than or equal to 0.3 mm.

10. A backlight unit according to claim 9, wherein the thickness of the light deflecting film is about 0.2 mm.

* * * * *